Jan. 11, 1944.   S. V. WINTON   2,338,750
GAS FLOW INDICATOR
Filed Dec. 8, 1941
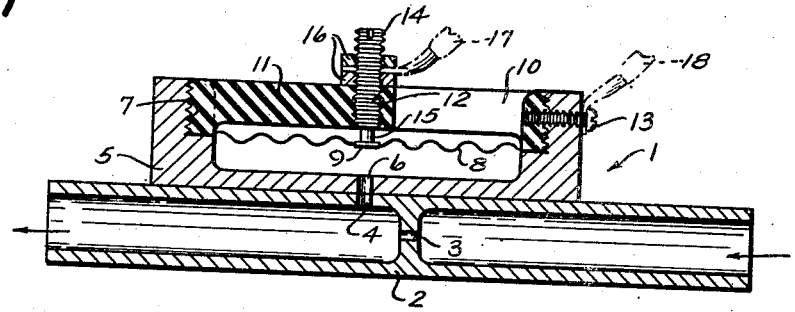
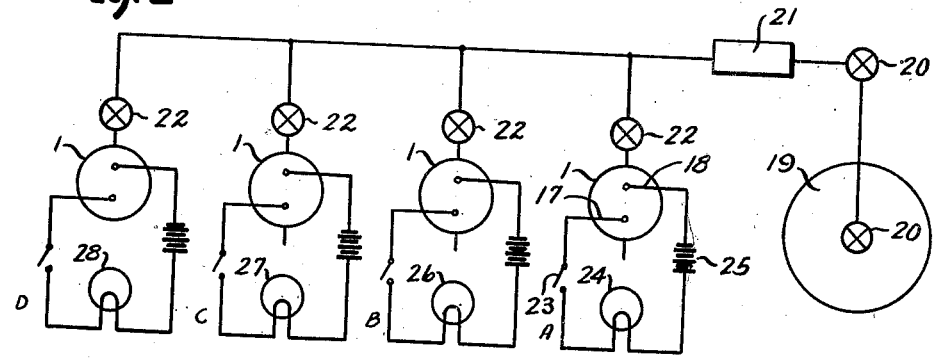
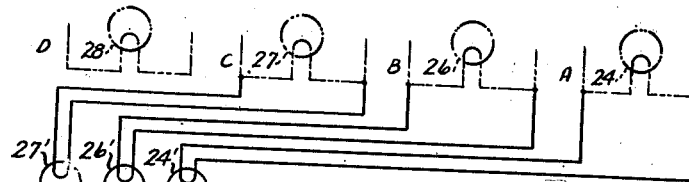
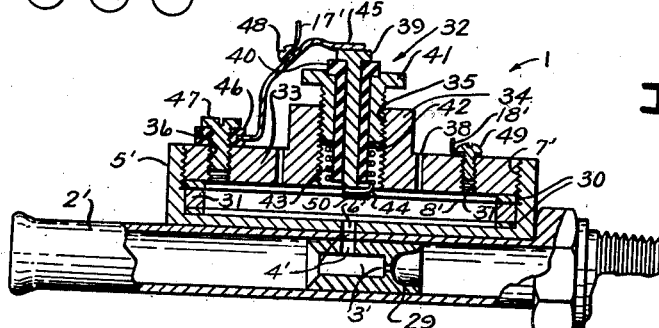
SIDNEY V. WINTON  INVENTOR
BY
ATTORNEYS Patented Jan. 11, 1944

2,338,750

UNITED STATES PATENT OFFICE 2,338,750

GAS FLOW INDICATOR

Sidney V. Winton, Yellow Springs, Ohio

Application December 8, 1941, Serial No. 422,097

2 Claims. (Cl. 200—83)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to means for providing each member of an aircraft crew receiving oxygen from a common source with a positive warning in the event that his individual flow of oxygen is interrupted.

Another object of the invention is to provide additional means whereby the commander of such an aircraft is simultaneously warned as to which one or more of his crew members is failing to receive an uninterrupted supply of oxygen from said common source.

This invention is equally applicable to the individual members of a submarine crew receiving oxygen from a common source or to their commanding officer as a means for determining the location of oxygen supply interruption to any one or more of the aforesaid individual crew members.

Other applications of the invention will be apparent from the following descriptions of the presently indicated embodiments thereof taken in connection with the accompanying drawing, wherein:

Fig. 1 represents a sectional view through a purely schematic representation of the pressure sensitive or reacting portion of my invention;

Fig. 2 is a diagrammatic representation of the signal portion of my invention which pertains to the individual crew members;

Fig. 3 is a diagrammatic representation of the signal portion of my invention which pertains to the crew commander; and Fig. 4 is a cross-sectional view through the pressure sensitive or reacting portion of one embodiment of my invention.

The combined parts illustrated in Fig. 1 are hereinafter referred to as constituting a pressure reactor 1. The pressure reactor 1 is made up of a conduit 2 provided with a Venturi orifice 3 and a negative pressure escapement hole 4 located down flow of the Venturi orifice 3; of a metallic chamber 5, fixed to the conduit 2, having its sealed end connected to the escapement hole 4 by means of a connecting hole 6 and its open end provided with a threaded recess 7; of a flexible metallic diaphragm 8, seated at the bottom of the threaded recess 7, having a silver tipped contact point 9 centrally disposed upon the upper or exposed surface thereof; of a diaphragm clamping ring 10, constructed of any suitable insulating material, with an inwardly projecting lug 11 having an axially located threaded hole 12 and locking screw 13; and of a threaded (metallic) conductor 14, having a silver tipped contact point 15 and normally held against movement by means of two lock nuts 16. Phantom wire terminals 17 and 18 are shown, respectively, between the lock nuts 16 and beneath the locking screw 13.

Operation of the pressure reactor 1 can be best understood following a brief description of the diagrammatic showing of Fig. 2. In the latter figure, a main or common source of oxygen supply 19 is piped to members A, B and C, and to commander D of an aircraft (in which all personnel are equipped with oxygen masks) through two ante shut-off valves 20; a regulator control 21, four post or individual shut-off valves 22; and the four individual pressure reactors 1. As typically numeralled for crew member A, the wire terminal 17 is connected to one pole of a single throw switch 23; the remaining pole of the switch 23 is connected to one pole of a signal lamp 24; the remaining pole of the lamp 24 is connected to one pole of a battery 25; and the remaining pole of the battery 25 is connected to the wire terminal 18, thus completing A's signal circuit. For the purpose of future reference; B's signal lamp is identified by an additional numeral 26, C's lamp by additional numeral 27, and D's lamp by additional numeral 28. It is of course further assumed that the right hand portion of the conduit 2, of Fig. 1, is in direct connection with the post shut-off valve 22 and that the left hand portion of the aforesaid conduit 2 is directly connected with the oxygen mask worn by the crew member A.

Refering jointly to Figs. 1 and 2, the four post shut-off valves 22 are first carefully closed such that no pressure differential exists between the top and bottom surfaces of the flexible metal diaphragms 8, due to complete absence of oxygen flow through the conduits 2. Following additional closure of the four single throw switches 23, the conductors 14 of crew members A, B, C, and of commander D are each individually "screwed down" until the silver tipped contact points 9 and 15 are brought into just that degree of engagement which will assure continuing operation of the signal lamps 24, 26, 27 and 28 under zero flow conditions. Following accomplishment of the above described "contact point adjustment," the four conductors 14 are fixed against future movement by means of the eight lock nuts 16.

Let it be next assumed that the two ante shut-off valves 20 and the four post shut-off valves 22 are opened. Referring to Fig. 1, it is at once evident that as long as an uninterrupted flow of oxygen is caused to pass from the right to the left hand portion of the conduit 2, the jet-like egress of oxygen from the down flow side of the orifice 3 will cause a decided pressure drop adjacent thereto. Since the negative pressure escapement holes 4 and 6 have been purposely located within the aforesaid pressure drop area, the previously existing "no pressure differential" between the top and bottom surfaces of the flexible metal diaphragm 8 is completely upset. A top surface pressure increase, equal to the above-mentioned pressure drop or decrease, causes each diaphragm 8 to "bow down," as viewed in side elevation, such that the four sets of contact points 9 and 15 are no longer in engagement and the signal lamps 24, 26, 27 and 28 are thereupon rendered inoperative; a condition utilized to indicate satisfactory oxygen flow. Since a burned out filament would also render any one or more of the aforesaid lamps inoperative, periodic "check closure" of the four post shut-off valves 22 should be observed as a precautionary measure.

In Fig. 3, a second set of signal lamps 24', 26' and 27' are shown connected in parallel with a phantom outline of three signal lamps 24, 26 and 27 of Fig. 2, in order that commander D may receive independent warning in the event that any one or more of his crew members is deprived of his normal flow of oxygen. "Check closure" of the first, the second, and the third post shut-off valves from the right hand portion of Fig. 2 also verifies that the filaments of the commander's signal lamps 24', 26' and 27' are in proper working order.

Fig. 4 shows one, though not necessarily a preferred, working embodiment of the pressure sensitive or reacting portion of my invention. This pressure reactor 1' is made up of a conduit 2' having a negative pressure escapement hole 4' and Venturi orifice 3' provided in a plug 29 which is further supplied with a negative pressure escapement hole 4' in continuation of said first-mentioned escapement hole 4'; of a chamber 5', fixed to the conduit 2', having its sealed end connected to the escapement holes 4' by means of a connecting hole 6' and its open end provided with a threaded recess 7'; of a gasket 30, a metal ring 31, an oxygen resistant diaphragm 8' (of later referred to composition) and a second gasket 30 seated for the greater part in the non-threaded portion of the chamber 5'; and of a diaphragm clamping and conductor portion 32. The clamp-conductor 32 is in turn made up of a disc 33 having a wrench boss 34 with centrally threaded hole 35, two additional threaded holes 36 and 37, and two vent holes 38; of a silver tipped metallic contact rod 39 within an insulator 40 pressed into a contact screw 41 having a washer 42 at the base thereof against which seats a sensitive wire spring 43 terminating at its bottom end in a silvered metallic contact point 44; of a metallic locking spring 45 with a mounting base 46 of insulating material secured to the disc 33 by means of a screw 47 and with a second screw 48 for attaching a wire terminal 17'; and of a screw 49 for attaching a wire terminal 18'. The diaphragm 8' may be constructed of oxygen-resistant rubber composition, of neoprene, of metal or of whatever other material is proven best by experimental and service test of my invention by the Army Air Forces and may be further provided with a non-metallic reinforcement patch 50.

The pressure reactor 1' of Fig. 4 operates as follows: As initially installed upon the lower end of the insulator 40, the sensitive spring 43 holds its contact point 44 slightly away from the silvered tipped contact rod 39. To effect a "closed contact" condition parallel to that previously discussed in connection with the contact points 9 and 15 of Fig. 1, it is necessary that the contact screw 41 be "screwed down" until the reinforcement patch 50 of the diaphragm 8' is brought into sufficient contact with the bottom of the contact point 44 to bring about such foreshortening of the spring 43 as will cause just that degree of engagement between the silvered surfaces of the contact rod 39 and the contact point 44 that will insure continuing operation of the signal system connected to the wire terminals 17' and 18'.

Since the conduit and sealed chambered portions of the pressure reactors 1 and 1' are structurally identical, it is at once evident that a continuing condition of oxygen flow through the latter reactor will cause the diaphragm 8' of Fig. 4 to "bow down," as viewed in side elevation, thus permitting the spring 43 to "break contact" between the silvered surfaces of the contactor rod 39 and the contact point 44, which in turn discontinues operation of the signal system connected to the wire terminals 17' and 18'.

Although the descriptions of this specification are specific to the illustrations of Figs. 1 through 4, or readily understood modifications thereof, it is to be understood that there may be departures therefrom which will still clearly fall within the field and scope of the subject invention, and I therefore do not wish to be restricted thereto, but only in so far as the appended claims are so limited.

Having thus described my invention, what I claim as new and desire to secure by Letters Patent of the United States is:

1. A flow-responsive electric switch comprising a housing containing a chamber having one side open, a flexible diaphragm of electrically conductive material covering said open side and being in electrical communication therewith, a diaphragm clamp ring of insulating material for securing said diaphragm pressure tight over said open side, an adjustable terminal screw centrally disposed in said clamp ring, a contact point on the inner end of said screw, a second contact point centrally positioned in said diaphragm and in engagement with the first contact point when the device is not operating, means for securing a terminal wire to said housing, means for fastening a second terminal wire to said screw, a flow conduit having a single laterally extending passageway communicating with said chamber, and means restricting the flow area of said conduit near said passageway and upstream thereof whereby the pressure drop at said laterally extending opening operates on said diaphragm to separate the two said contact points to maintain an open circuit as long as there is normal flow in said conduit, but said contacts will be engaged when flow in said conduit is interrupted.

2. A flow-responsive electric switch comprising a metal housing containing a chamber, a flow conduit alongside said chamber, a diaphragm separating said chamber into two compartments, the one compartment being connected to the atmosphere, and the flow conduit being connected by a single lateral passageway to the other compartment, means restricting the flow area of said conduit at said passageway and further restricting said area adjacent said passageway and upstream thereof, an electrical contact member insulatedly supported centrally in said housing on said atmosphere side of said diaphragm, means to adjust said contact member toward or away from said diaphragm, a second contact member between the first contact member and the diaphragm, spring means urging said second contact member away from the first and toward the diaphragm, means to adjust said spring means, wire terminal post means in electrical communication with the first said contact member, and wire terminal post means in electrical communication with said housing.

SIDNEY V. WINTON.